United States Patent [19]

Farina

[11] Patent Number: 5,372,833
[45] Date of Patent: Dec. 13, 1994

[54] ROASTING SYSTEM AND METHOD
[75] Inventor: Stefano Farina, Bologna, Italy
[73] Assignee: Petroncini SPA, Sant'Agostino, Italy
[21] Appl. No.: 94,483
[22] Filed: Jul. 19, 1993
[51] Int. Cl.$^5$ .................. A23L 1/00; A23N 12/00
[52] U.S. Cl. ...................... 426/466; 99/483;
126/21 A; 126/273 R; 426/467
[58] Field of Search ............ 426/466, 467, 469, 520;
99/483; 126/21 A, 21 R, 273 R

[56] References Cited

U.S. PATENT DOCUMENTS 3,345,180 10/1967 Smith, Jr. .................. 426/467
5,185,171 2/1993 Bersten .................. 426/466

Primary Examiner—George Yeung
Attorney, Agent, or Firm—McAulay Fisher Nissen Goldberg & Kiel

[57] ABSTRACT

A roasting system and method for avoiding contact between food to be roasted and combustion materials, in which a heat exchanger is heated by a heated flow from a combustion chamber and the heated flow exhausts through an exhaust outlet associated with the heat exchanger. To avoid food contact with the heated flow, an intake air flow duct draws in outside air and conveys the drawn-in air past the heat exchanger free of contact with the heated flow or heated material forming the heated flow for heating the drawn-in outside air by induction. A surround chamber surrounding the combustion chamber in heat exchange relationship therewith is connected with the intake air flow after it is heated by the heat exchanger for conveying the heated intake air flow to the surround chamber for heating thereof the surround chamber by heat from the combustion chamber, then the heated air flow is conveyed to a roasting chamber for heating the food. A cyclone separator is coupled to the roasting chamber through an intake group for separating the larger particles from the air flow prior to exhaust to the outside. Exhaust can also take place through the same exhaust from the heat exchanger.

17 Claims, 2 Drawing Sheets

ROASTING SYSTEM AND METHOD

BACKGROUND OF THE INVENTION

FIELD OF THE INVENTION

This invention is concerned with a method and system for roasting of a food product by means of heated gaseous flow. More particularly, the invention is concerned with avoiding contact between smoke issuing from a heat generator and a food product so as to avoid having polluting combustion residues coming into contact with the food product.

DESCRIPTION OF THE PRIOR ART

In the roasting of food, ecological problems arise due to air pollution.

In current roasting plants, both in those which are intermittently operated, which generally use a perforated rotating bin, and in those continuously operated, which use a vibrator belt, a fluidized bed or the like, the food product which is heated or roasted are crossed or passed over by a forced heat flow, coming from a combustion chamber, and the heat flow includes a mixture comprising air sucked up from outside and smoke, including by-products contained therein produced by a heat generator and the combustion chamber.

The gas flow is at a temperature which varies from 200° C. to 850° C., then passes over the foods to be heated in continuous movement into a roasting chamber so as to exert a licked action (moving lightly and quickly like a flame) on the surface of the foods which tends to release the suspended solid particles such as combustion residues. This results in a production of polluting substances being applied directly onto foods, such as organic substances with the presence of carbon monoxide, nitrogen, sulfur and the like, which then negatively affect both the health qualities of the foods as well as the characteristics of the food so as also to cause damage to their aromatic qualities. Moreover, the forced flow exiting from the roasting chamber is taken to a variable temperature of from 400° C. to 800° C. to reduce the organic substance content in suspension into it before letting the same out to the outside.

SUMMARY OF THE INVENTION

In one embodiment of the system according to the invention, by re-employing the heat flow which results from the roasting, energy savings are realized and also produce a solution to an ecological problem by reducing air pollution. The system according to the invention is particularly useful to roast food for human consumption and nourishment, such as coffee, barley, cacao, peanuts and the like.

In comparison with the prior art, this current system proposes the use of a novel and a new roasting plant for avoiding contact between the combustion residues and the food by means of a set realizing a heat induction transfer. In this way, the food as well as the aroma emanating from the food is preserved, while the roasting of the food provides both a healthy characteristic, to avoid physical damage for the consumer, as well as characteristics for permitting the aromatic quality preservation.

Other objects and advantages will be appreciated from the following description.

DESCRIPTION OF THE PREFERRED EMBODIMENTS

Referring now more particularly to the drawings which indicate the presently preferred modes for carrying out the invention.

Figure 1:
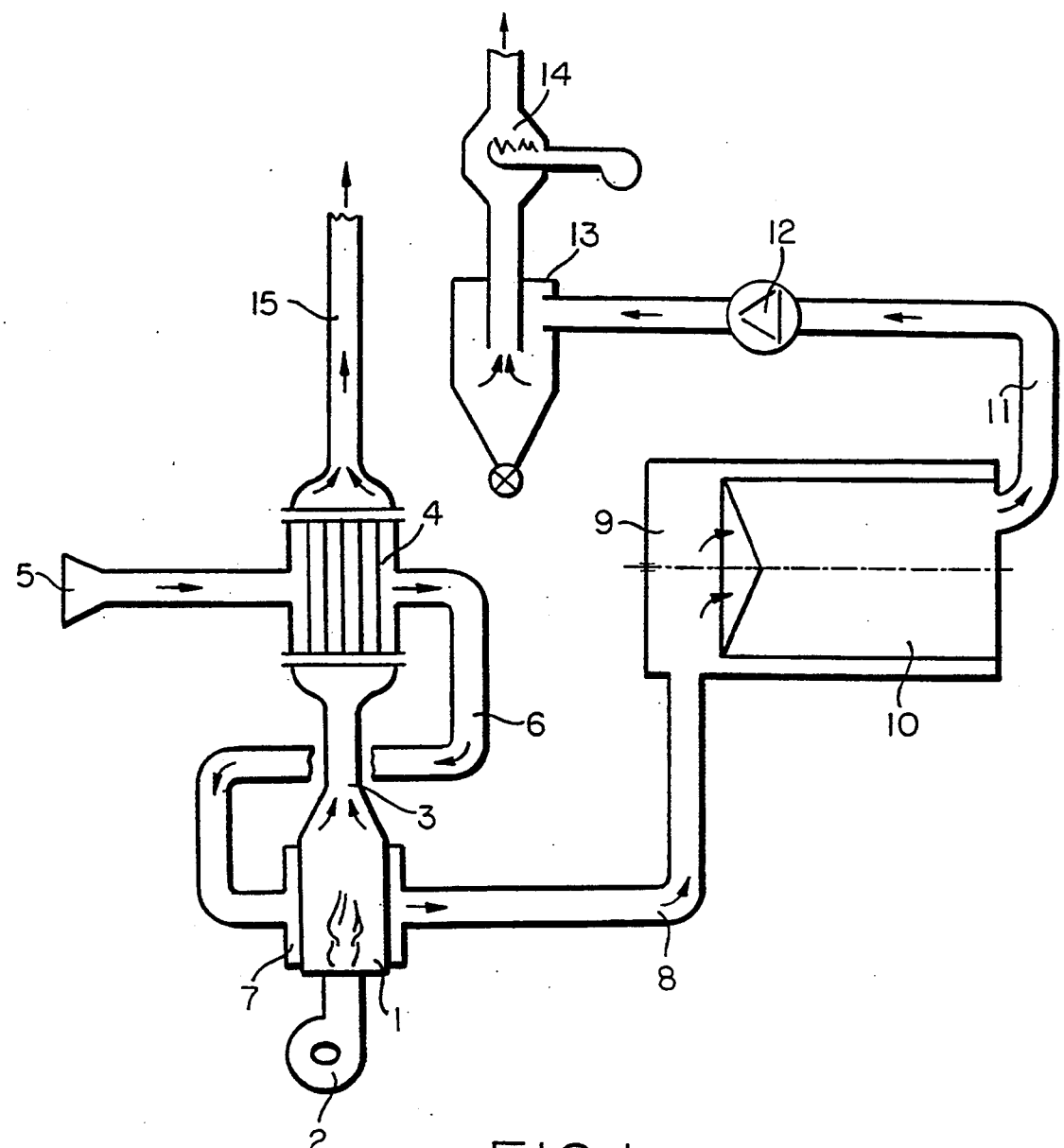
FIG. 1 is a schematic showing of a roasting plant according to the invention for heat transfer by induction.

The roasting system shown in FIG. 1 comprises a combustion chamber 1 which is heated by means of a burner 2. Collector 3 is connected with an exhaust from combustion chamber 1 and to an input to heat exchanger 4. After the heat and smoke produced by combustion chamber 1 pass through heat exchanger 4, such heat and smoke then passes through pipe 15 for exiting to the outside atmosphere. Suction air intake 5 is provided to establish an air flow to draw outside air into pipe 6. The air flow after traversing heat exchanger 4 goes into an air flow circulation path started by pipe 6. Heat exchanger 4 which has the heat and smoke from chamber 1 pass therethrough is in heat exchange relationship with the air flow from air intake 5 for heating the outside air which passes across heat exchanger 4. The air flow under intake 5 is heated by induction and then is conveyed through pipe 6 to surround chamber 7 which is external to and surrounds combustion chamber 1 to isolate the air flow from the heated air in combustion chamber 1.

The air in surround chamber 7 is now further heated by chamber 1 and then it is passed by means of exhaust pipe 8 to a roasting chamber 9 provided with a roasting unit 10. After the heated air flow passes through the roasting unit 10 it exits through discharge pipe 11 from roasting chamber 9 and is sucked into a cyclone separator 13 by suction device or intake group 12 coupled between separator 13 and pipe 11.

A post-combustion unit 14 is coupled to cyclone separator 13 and the air flow brought in through air intake 5 exits to the atmosphere.

Figure 2:
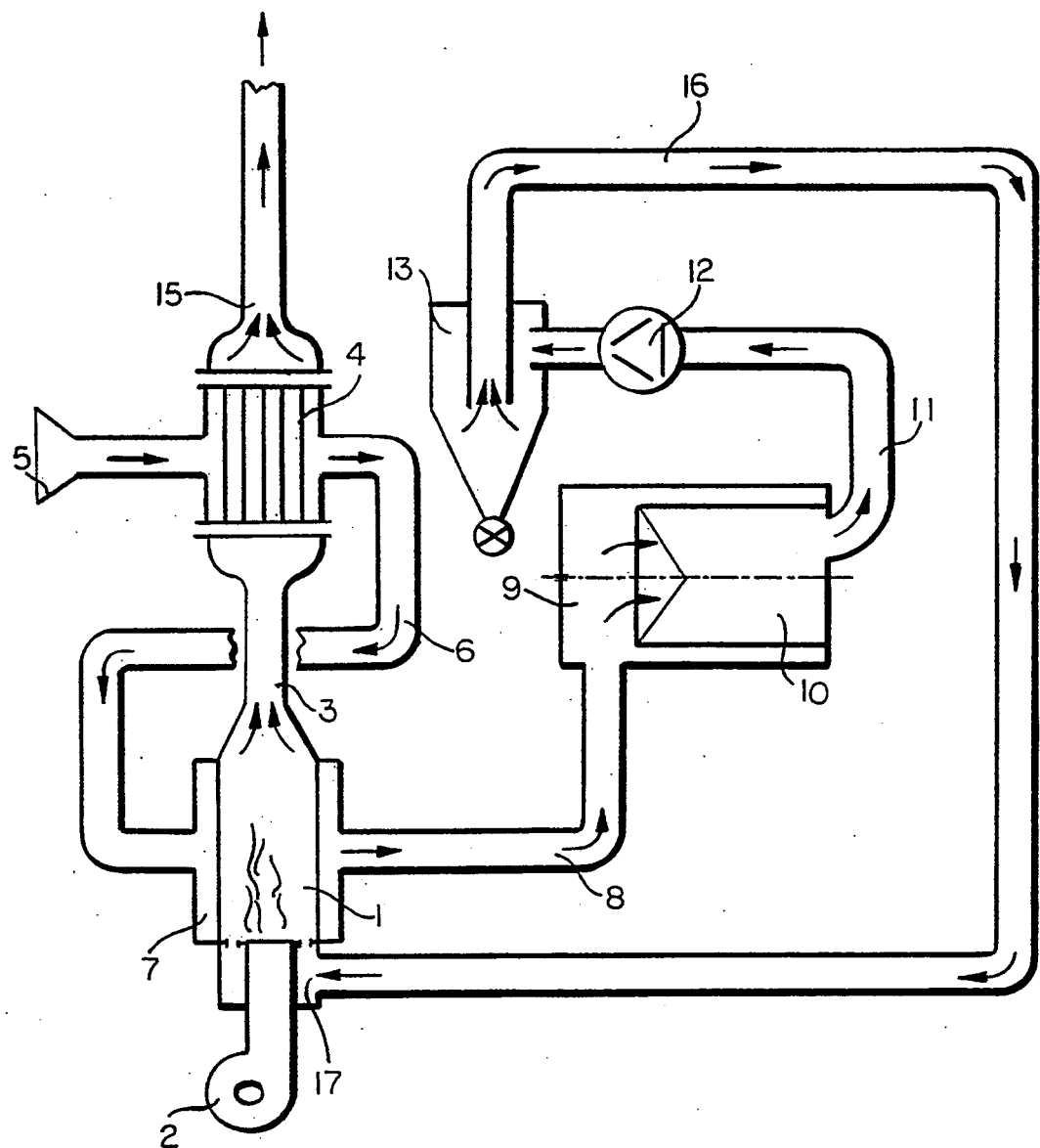
FIG. 2 is a schematic showing similar to that of FIG. 1 of a roasting plant for the transfer of heat by heat induction as in the pant of FIG. 1 and further provided with means to recover heat flow resulting from roasting and to re-use the heat flow without contacting the food.

Referring now more particularly to FIG. 2, a roasting system similar to FIG. 1 is shown, but the post-combustion unit (14) is omitted and the air flow from the cyclone separator is recirculated into combustion chamber 1 for exiting after recirculation through exhaust pipe 15 from combustion chamber 1 through collector 3 after it passes through heat exchanger 4.

In the FIG. 2 embodiment, only a single exhaust through recirculating pipe 16 is provided and, while the air flow coming into air intake 5 is combined with the air in combustion chamber 1, it is isolated from the air in combustion chamber 1 until it is used as a heated air flow in the roasting chamber 1.

For this purpose, the air flow is connected from cyclone separator 13 to a collector 17 which feeds the air flow into combustion chamber 1 at the bottom thereof after the air flow has been used to heat the food in the roasting unit, and any residual heat in the spent air flow is combined with the heated air in combustion chamber 1 prior to being brought into contact with heat exchanger 4. This results in a further savings in the cost to provide fuel to burner 2.

FIG. 1 is primarily concerned with a roasting system which provides for heat and smoke production in a combustion chamber 1 and the burner 2 for heating material in the combustion chamber. The heat and smoke produced then passes through a collector 3 and passes through a heat exchanger 4 with distinct flows where outside air is heated by induction while the air flow is being sucked in from the outside by air intake 5 and then the heat and smoke and any contaminants from combustion chamber 1 are discharged outwardly through exhaust pipe 15 by natural ventilation pressure. The flow coming from the air intake 5 and heated by the heat exchanger 4 is maintained at all times out of contact with the heated flow from combustion chamber 1 and is fed by pipe 6 into surround chamber 7 centrally surrounding combustion chamber 1 but at all times isolated therefrom prior to any contact with food. The forced flow is overheated or superheated by contact of the wall of the surround chamber 7 with the wall of the combustion chamber 1 to the required temperature and by means of exhaust pipe 8 from surround chamber 7 is introduced into roasting chamber 9 where it passes roasting unit 10 over food to be heated, cooked or roasted. The heated air flow crosses the foods so as to heat the same to the required temperature and then it is discharged through discharge or exit pipe 11 with roasting smokes and particles in suspension, and discharged air flow with particles in suspension is then sucked by intake group or suction device 12 forming the forced circulation. The gaseous flow discharged from roasting chamber 9 comes finally to cyclone separator 13 and removes the larger dimensioned particles from the air flow. The air flow so cleaned is then passed through a post-combustion unit 14 which superheats the remaining suspended residues produced by the food to a temperature higher than the ignition temperature, and is then turned out into the outward environment at a temperature which varies from 400° C. to 700° C.

In FIG. 2, the post combustion unit 14 is eliminated and the air flow which exits from cyclone separator 13 has its air flow together with any remaining suspensions contained therein remaining from the roasting fed by recirculating pipe 16 to collector 17 which is positioned at the lower end of the combustion chamber 1. The collector 17 then permits the same flow which entered through air intake 5 to enter into the combustion chamber 1, but after contact with the food in roasting unit 10, to provide for a further heat transfer.

The gaseous flow acting on the heat recovery, the combustion temperature and the suspended volatile substances are then burnt in presence of an air overplus or excess air so going through a transformation which originates suspended non-polluting residue such as carbon dioxide, water vapor and others.

DESCRIPTION OF THE OPERATION

Heat and smoke production takes place in combustion chamber 1 which is heated by means of burner 2, and the smoke and heat then flows through the collector 3 until it reaches and enters into heat exchanger 4. Outside air intake 5 which extends across heat exchanger 4 with distinct flows so that the outside air is heated by induction without any contact with the heated flow from combustion chamber 1 to heat the air flow sucked from outside by the air intake 5 and then they are discharged outwardly by natural ventilation pressure or by forced intake.

The flow coming from the air intake 5 is heated by the heat flow from collector 3 and is fed by pipe 6 into surround chamber 7 centrally surrounding combustion chamber 1. In this way, the forced flow is overheated or superheated by contact between the walls of the combustion chamber 1 and surround chamber 7 to the required temperature and by means of exhaust pipe 8 the superheated air is exhausted from surround chamber 7 and enters into the roasting chamber 9 where it runs or passes over foods in movement into the roasting unit 10. The heated air flow crosses the food to heat the same to the required temperature and then it is discharged through discharge or exit pipe 11 with the smoke and particles contained in the smoke resulting from the roasting in suspension and it is then sucked by suction by means of intake group 12 forming the forced circulation. The gaseous flow is then finally fed to cyclone separator 13 which functions to remove the larger dimensioned particles from the air flew. The flow is then further cleaned through a post-combustion unit 14, which is capable of overheating the suspended residues given out by the working goods to a higher temperature to the ignition temperature, and is then exhausted into the outward ambient environment at a temperature between 400° C. to 700° C.

The combustion flow produced in the burner 2 after the heat content contained therein is imparted to the air flow sucked in by the suction air intake 5 into the heat exchanger 4 exits through pipe 15.

In the embodiment of FIG. 1, the air flow from the cyclone separator 13 exits to the atmosphere through post combustion unit 14. In the FIG. 2 embodiment, the air flow with the suspension that still remains from the roasting is transferred through pipe 16 from cyclone separator 13 and goes to a collector 17 which is positioned at the lower end of the combustion chamber 1. Collector 17 and combustion chamber 1 are connected with each other, and collector 17 opens into chamber 1 so that the flow in recirculating pipe 16 is passed into combustion chamber 1 to be heated with other products in chamber 1, and is recycled with the same flow into the combustion chamber 1 to produce a further heat transfer. Moreover, reaching the gaseous flow acting on the heat recovery with the combustion temperature, the suspended volatile substances then burn in presence of an air overplus or excess air to go through a transformation which originates suspended non-polluting residues such as carbon dioxide, water vapor and others.

While there has been shown and described what are considered to be the preferred embodiments of the invention, various changes and modifications may be made without departing from the scope of the invention.

I claim:

1. A roasting system for avoiding contact between food to be roasted and combustion materials, comprising:

a combustion chamber and a burner for heating material in said combustion chamber;

a heat exchanger having an inlet and an outlet, said inlet being connected with a collector from said combustion chamber through which the material heated in said combustion chamber exits and enters into said heat exchanger, and providing an exhaust outlet through which the heated material exits after passing through said heat exchanger;

an intake air flow duct for taking in outside air and conveying the air past said heat exchanger free of contact with said heated material for heating thereof by induction from the heat imparted to said heat exchanger from the heated material exiting from said combustion chamber;

a surround chamber surrounding said combustion chamber in heat exchange relationship therewith connected with a conveyor pipe coupled with said air intake flow duct for conveying the heated air after it passes said heat exchanger to said surround chamber for heating the air in said surround chamber by heat from said combustion chamber;

a roasting chamber having an inlet connected with said surround chamber and an outlet for exhausting the heated air after it passes through said roasting chamber;

an intake group for forcing circulation of the air brought in from said air intake coupled to said roasting chamber; and a cyclone separator having an outlet and an inlet, said cyclone separator inlet being coupled to said intake group for separating larger particles from the air flow.

2. The roasting system as claimed in claim 1, including:

a collector coupled with said combustion unit; and a recirculation pipe coupled to an exhaust from said cyclone separator and to said collector for supplying the air flow exhausted from said cyclone separator to said collector for recirculating and exhausting said air flow through said outlet pipe.

3. The roasting system as claimed in claim 2, wherein said collector is air flow coupled to said combustion chamber at the lower end thereof for causing said air flow to enter into said combustion chamber to provide for further heat transfer to said material in said combustion chamber from the flow from said roasting chamber.

4. The roasting system as claimed in claim 3, wherein the exhaust from said roasting chamber after combination with said material in said combustion chamber is exhausted through said heat exchanger outlet.

5. The roasting system as claimed in claim 1, including a post-combustion unit coupled to the outlet of said cyclone separator for burning particles not removed by said cyclone separator and then exhaust into the outer environment.

6. The roasting system as claimed in claim 5, wherein said post-combustion unit overheats the suspended residues produced by the food heated to a temperature higher than the ignition temperature and then exits to the outside atmosphere through an exhaust from said post-combustion unit at a temperature which varies between 400° C. to 700° C.

7. The roasting system as claimed in claim 1, wherein said air intake includes a suction air intake.

8. The roasting system as claimed in claim 1, wherein said roasting chamber includes a roasting unit therein.

9. The roasting system as claimed in claim 1, including means for combining the outside air with the material in said combustion chamber after it passes through said roasting chamber.

10. The roasting system according to claim 1, including means causing the suspended volatile substances to burn in the presence of air through a transformation which originates suspended non-polluting particles.

11. A roasting method for avoiding contact between food to be roasted and combustion materials, comprising:

heating material in a combustion chamber;

exhausting the heated material from the combustion chamber to a heat exchanger having an inlet connected with a collector from the combustion chamber through which the heated material from the combustion chamber exits, and an outlet from the heat exchanger through which the heated material exits after passing through the heat exchanger;

intaking outside air through an intake air flow duct for taking in the outside air and conveying the outside air past the heat exchanger for heating thereof by induction from the heat imparted to the heat exchanger from the heated material exiting from the combustion chamber;

conveying the outside air heated by induction to a surround chamber surrounding the combustion chamber in heat exchange relationship therewith connected with a conveyor pipe coupled with the air intake flow duct for conveying the heated air after it passes the heat exchanger to the surround chamber for heating the air in the surround chamber;

roasting the food in a roasting chamber having an inlet connected with the surround chamber for obtaining the heated air flow therefrom and an outlet for exhausting the heated air after it roasts the food and passes through the roasting chamber;

forcing circulation of the air brought in from the air intake by means of an air intake group coupled to the roasting chamber to aid in the exhaust thereof; and separating larger particles in the air flow after it leaves the roasting unit with a cyclone separator having an outlet and an inlet, the cyclone separator inlet being coupled to the forced circulation intake group for separating the larger particles from the air flow.

12. The roasting method as claimed in claim 11, including causing the suspended volatile substances to burn in the presence of air through a transformation which originates suspended non-polluting particles.

13. The roasting method as claimed in claim 11, including supplying the air flow to a post-combustion unit coupled to the outlet of the cyclone separator for exhaust into the outer environment.

14. The roasting method as claimed in claim 13, including overheating the suspended residues produced by the food to a higher temperature than the ignition temperature and then exiting it to the outside atmosphere through an exhaust from the post-combustion unit at a temperature which varies between 400° C. to 700° C.

15. The roasting method as claimed in claim 11, including recirculating the exhaust from the cyclone separator to a collector for supplying the air flow exhausted from the cyclone separator to a collector coupled with the combustion unit for recirculating and exhausting the air flow through the outlet pipe.

16. The roasting method as claimed in claim 15, including causing the air flow to enter into the combustion chamber from the cyclone separator through the collector to provide for further heat transfer to the air flow on the outside of the heat exchanger.

17. The roasting method as claimed in claim 11, including providing a roasting unit inside the roasting chamber for supplying the heated air flow to the food.

* * * * *